United States Patent
Freed et al.

(10) Patent No.: US 7,541,931 B1
(45) Date of Patent: Jun. 2, 2009

(54) PROCEDURE FOR RFID TAGGING OF REUSABLE PLASTIC CONTAINERS (RPCS)

(75) Inventors: Tali Freed, Atascadero, CA (US); Stefan Van Der Bijl, Monterey, CA (US)

(73) Assignee: California Polytechnic Corporation, San Luis Obispo, CA (US)

( * ) Notice: Subject to any disclaimer, the term of this patent is extended or adjusted under 35 U.S.C. 154(b) by 307 days.

(21) Appl. No.: 11/588,676

(22) Filed: Oct. 26, 2006

Related U.S. Application Data

(60) Provisional application No. 60/737,870, filed on Nov. 17, 2005.

(51) Int. Cl.
*G08B 13/14* (2006.01)

(52) U.S. Cl. .................................................. 340/572.8

(58) Field of Classification Search ... 340/572.1–572.9; 235/462.01
See application file for complete search history.

(56) References Cited

U.S. PATENT DOCUMENTS

| 2006/0080819 | A1* | 4/2006 | McAllister | 29/403.3 |
| 2007/0012541 | A1* | 1/2007 | Boydston et al. | 194/205 |

* cited by examiner

*Primary Examiner*—Phung Nguyen
(74) *Attorney, Agent, or Firm*—Martine Penilla & Gencarella, LLP

(57) ABSTRACT

A method for identifying a reusable plastic container (RPC) includes attaching a durable RFID tag and a separate sticker-label to the RPC. The separate sticker-label including printed information relating to the RPC. The RPC can be filled with a selected contents and the durable RFID scanned. A sanitation cycle can be applied to the RPC. The sanitation cycle includes removing the separate sticker-label. The separate sticker-label being optimized for removal during the sanitation cycle. The durable RFID tag being optimized to remain functional and attached to the RPC through a selected number of multiple sanitation cycles.

20 Claims, 3 Drawing Sheets

PROCEDURE FOR RFID TAGGING OF REUSABLE PLASTIC CONTAINERS (RPCS)

CROSS REFERENCE TO RELATED APPLICATIONS

This application claims priority from U.S. Provisional Patent Application No. 60/737,870 filed on Nov. 17, 2005 and entitled "Procedure for RFID Tagging of Reusable Plastic Containers (RPCs)," which is incorporated herein by reference in its entirety.

BACKGROUND

The present invention relates generally to packaging, and more particularly, to methods and systems for tracking packaging systems.

Many companies are being required to use RFID systems to identify and track packages, and the contents therein, that are delivered to shippers, distributors, retailers and other participants in the distribution chain. By way of example, some companies, such as Tanimura & Antle (T&A, hereafter) of Salinas, Calif., are being required to comply with a Wal*Mart mandate to provide an RFID tag on every produce container shipped to Wal*Mart's distribution centers. The containers must also carry a barcode label and a description of the contents. The produce and many other products are shipped in reusable plastic containers (RPCs) that can be reused for multiple shipments.

Currently only a few selected growers of particularly large volume are mandated to RFID tag their RPCs, and only RPCs shipped to Wal*Mart's Texas distribution centers are included in the Wal*Mart mandate. However, within the foreseeable future the Wal*Mart mandate will include all of its produce growers/shippers and all of Wal*Mart's distribution centers across the nation. In addition to Wal*Mart other retail chains that sell produce and other products, such as Albertson's and Target have proposed mandates on their vendors starting in January 2007.

The current process of RFID tagging of the RPCs is known as "Slap and Ship" and includes printing a three-in-one sticker-label that includes a single-use RFID tag, a barcode, and a description of the content. The three-in-one sticker-label is then applied to the RPC. The total cost of "slap and ship" is expected to rapidly grow to billions of dollars annually in 2006, in preparation for these mandates.

Since the RPC content may vary from one shipment to the next, a new sticker-label is applied before every shipment. As a result, the three-in-one sticker-label must be removed from the RPC and disposed of when the RPC is prepared for a subsequent packing and shipping cycle. Preparing the RPC for the subsequent packing and shipping cycle can include cleaning the RPC to physically clean any residues from the RPC. The previous identification data and any tape or adhesive residues from packaging materials are also removed. Removing the residues, contamination, tags and cleaning the RPC for a subsequent shipment is typically referred to as a sanitation cycle.

As the RFID mandates expand, many industries are expected to incur many millions of dollars in RFID tag costs annually. A large part of the cost is due to the label conversion process and inability to reuse the RFIDs. In view of the foregoing, there is a need for a less expensive more flexible system and method for using RFIDs to identify and track the RPCs and their contents.

SUMMARY

Broadly speaking, the present invention fills these needs by providing a system and method for identifying and tracking a reusable plastic container (RPC) and its contents. It should be appreciated that the present invention can be implemented in numerous ways, including as a process, an apparatus, a system, computer readable media, or a device. Several inventive embodiments of the present invention are described below.

One embodiment provides a method for identifying a reusable plastic container (RPC) and includes attaching a durable RFID tag and a separate sticker-label to the RPC. The separate sticker-label includes printed information relating to the RPC. The RPC can be filled with a selected contents and the durable RFID can be scanned. A sanitation cycle can also be applied to the RPC. The sanitation cycle includes removing the separate sticker-label. The separate sticker-label is optimized for removal during the sanitation cycle. The durable RFID tag is optimized to remain functional and attached to the RPC through a selected number of multiple sanitation cycles.

The durable RFID tag can include a protective package. Attaching the durable RFID tag to the RPC can include securing the durable RFID tag to the RPC with at least one of a heat bond, an adhesive bond or a mechanical fastener. Attaching the durable RFID tag to the RPC can include applying a protective cover to protect the durable RFID tag on the RPC, or encasing the durable RFID tag in a protective cover before attaching it to the RPC.

At least a portion of the durable RFID tag can be reprogrammable. The reprogrammable portion of the durable RFID tag can be reprogrammed to correspond to at least one of a contents of the RPC, a transit location of the RPC or a status of the RPC.

At least one of the durable RFID tag and the separate sticker-label can be attached to the RPC substantially in-situ as the RPC is filled with the selected contents. Scanning the durable RFID tag can include correlating an output from the durable RFID tag to the selected contents.

The method can also include transferring the RPC from an originator to a retailer, such as via one or more distributors. The contents are removed from the RPC and the RPC returned to the originator for the sanitation cycle. The sanitation cycle can include sorting the RPC by the selected contents and cleaning the RPC according to a cleanliness specification for the selected contents. In at least one embodiment, the selected contents can include fresh produce although it should be understood that any contents could be contained in the RPC.

Another embodiment provides a method for identifying a reusable plastic container (RPC) including attaching a durable RFID tag and a separate sticker-label to the RPC. The separate sticker-label includes printed information relating to the RPC. The RPC is filled with a selected contents substantially simultaneously as the durable RFID tag and the separate sticker-label are attached to the RPC. At least a portion of the durable RFID is programmed to correspond with the selected contents. The RPC can be transferred from an originator to a retailer and the contents removed from the RPC. The RPC can also be returned to the originator. A sanitation cycle is also applied to the RPC. The sanitation cycle includes removing the separate sticker-label. The separate sticker-label is optimized for removal during the sanitation cycle. The durable RFID tag is optimized to remain functional and attached to the RPC through a selected number of multiple sanitation cycles. The selected contents can be produce and the RPC can be filled with the produce substantially at the same time as the produce is harvested.

Yet another embodiment provides a reusable plastic container (RPC) system including a RPC, a durable RFID tag attached to the RPC and a separate sticker-label attached to the RPC. The separate sticker-label includes printed information relating to the RPC. The separate sticker-label is optimized for removal during a sanitation cycle. The durable RFID tag is optimized to remain functional and attached to the RPC through a selected number of multiple sanitation cycles.

The durable RFID tag can also include a protective package. The durable RFID tag can be attached to the RPC with at least one of a heat bond, an adhesive bond or a mechanical fastener. The durable RFID tag can be attached to the RPC by a protective cover to protect the durable RFID tag on the RPC. At least a portion of the durable RFID tag can be reprogrammable.

The system can also include a controller, a RFID tag scanner coupled to the controller and located in a location suitable for scanning the durable RFID tag. At least a portion of the durable RFID tag can be reprogrammable and the RFID tag scanner is capable of reading and programming the durable RFID tag. The system can also include a sticker-label printer coupled to the controller.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Figure 1:
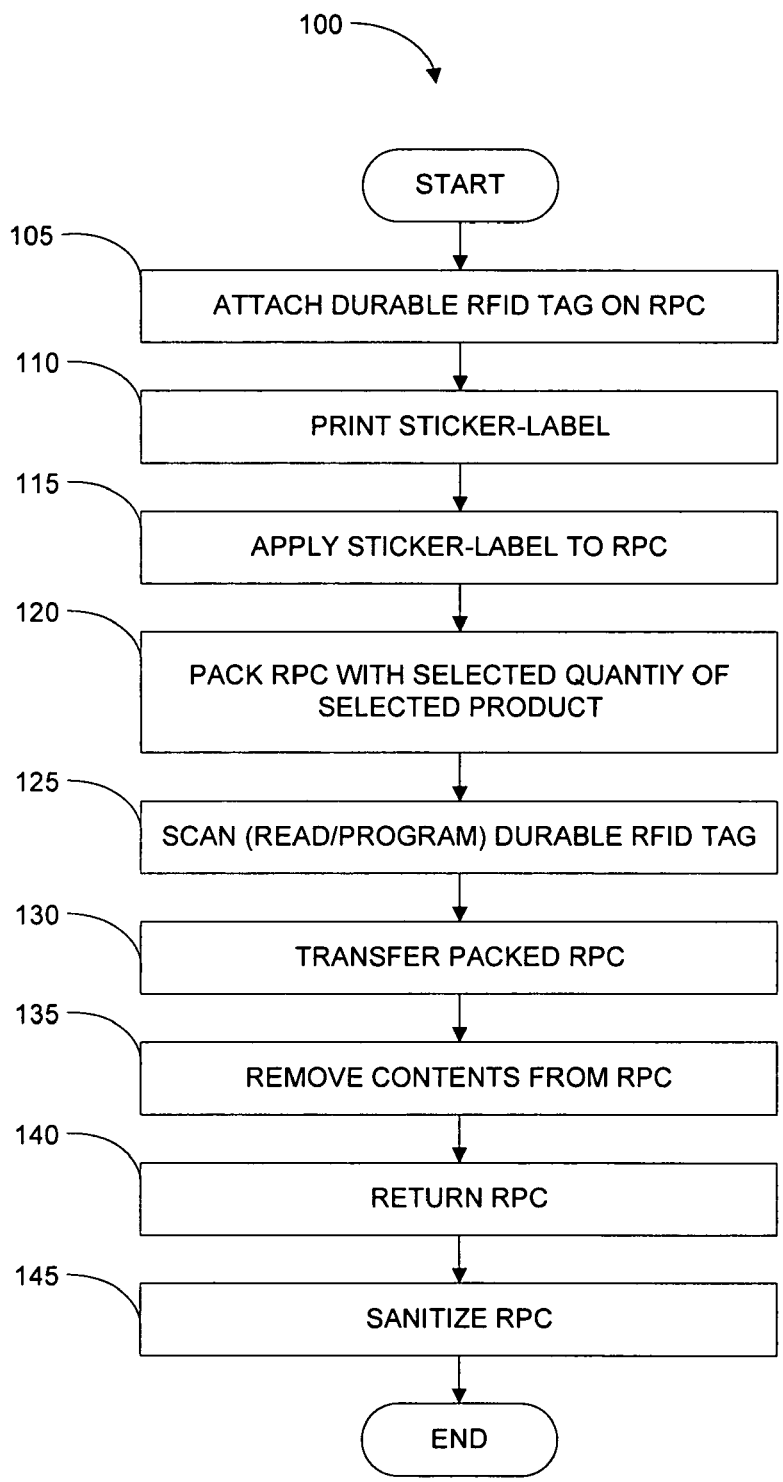
FIG. 1 is flowchart of the RPC identification and tracking process, in accordance with an embodiment of the present invention.

Several exemplary embodiments for an improved and novel procedure for applying and using RFID tags on reusable plastic containers (RPCs) will now be described. It will be apparent to those skilled in the art that the present invention may be practiced without some or all of the specific details set forth herein.

One embodiment provides a new labeling or identification process. The single-use, disposable RFID tag is replaced with a more durable, multiple use RFID tag. Further, the RFID tag is separated from the barcode label, and various other process changes. The durable RFID tag is secured to the RPC. The durable RFID tag can be protected by a protective coating. The durable RFID can also be reprogrammable so as to allow a change to at least a portion of the data output by the durable RFID.

The current cost of typical RFID tag is approximately $0.50. Produce companies such as T&A ship thousands of RPCs to retainers and distributors such as Wal*Mart everyday. Although the RPCs can be used for multiple shipping cycles, a new RFID tag is currently applied to every RPC at every cycle. Therefore, the current cost a large produce company incurs due to RFID tagging of RPCs is several thousands of dollars per day, or hundreds of thousands of dollars annually.

This new process is expected to yield cost savings of about 60%-80%. By way of example, current T&A cost for 200,000 RFID labels at $0.53 per label would be reduced from about $106,0000 to less than about $38,000. This equates to an approximate 64% savings assuming an RFID at $0.15 each or even less and substantially reduced RFID replacement and disposal of the removed RFID tag. Additionally, the RPCs can be leased and tracked throughout the distribution system. Tracking the RPCs themselves can allow an RPC lessor or owner or user to more easily determine a location for a given RPC and for groups and usage of the RPCs. By way of example, an RPC lessor may wish to track and/or determine the current number of leased RPCs that a selected lessee is using. In another example, the owners or users of a group of RPCs can track one or more RPCs in the group as being recalled or having reached a service limit.

One embodiment includes a standard, passive RFID tag with a relatively simple, inexpensive waterproofing method, such as a plastic sleeve or a lamination. The protected RFID tag then becomes very durable and can survive temperatures of about 500 degrees Fahrenheit. This durability allows the durable RFID tags to withstand the RPC sanitation cycle multiple times. Using a suitably strong adhesive to attach the durable RFID tags to the RPCs may result in several years of usage per durable RFID tag. Additionally, attaching the durable RFID tags to strategic location on the RPC can result in even more durability.

Since visual information on the RPC is still needed, barcode and other labels with the information printed on them are typically also necessary. As a result, a barcode label containing the barcode and any other printed information is also attached to the RPC. However, the information on the barcode label pertains to only a single shipment of the RPC. The RFID tag can be used for multiple shipments of the RPC.

Thus the RFID tag and the printed label can be handled separately. The RFID tag can optionally be reprogrammed for every new shipment and used multiple times. Reprogramming the RFID tag allows the RFID tag to be used for up to several shipment cycles and possibly even for several years. The reprogrammable RFID tags can also allow the RPC to be used by multiple originators, to ship many cycles of varied produce and other contents in the RPCs.

This new process substantially eliminates barcode scanning at the RPC loading point and reduces fatigue and hardware costs while also increasing data accuracy. The overhead of a label converter (for embedding the RFID tag in the barcode label) is eliminated. It also eliminates tag management costs. Warehouse and carton yard involvement is not necessary.

Figure 2:
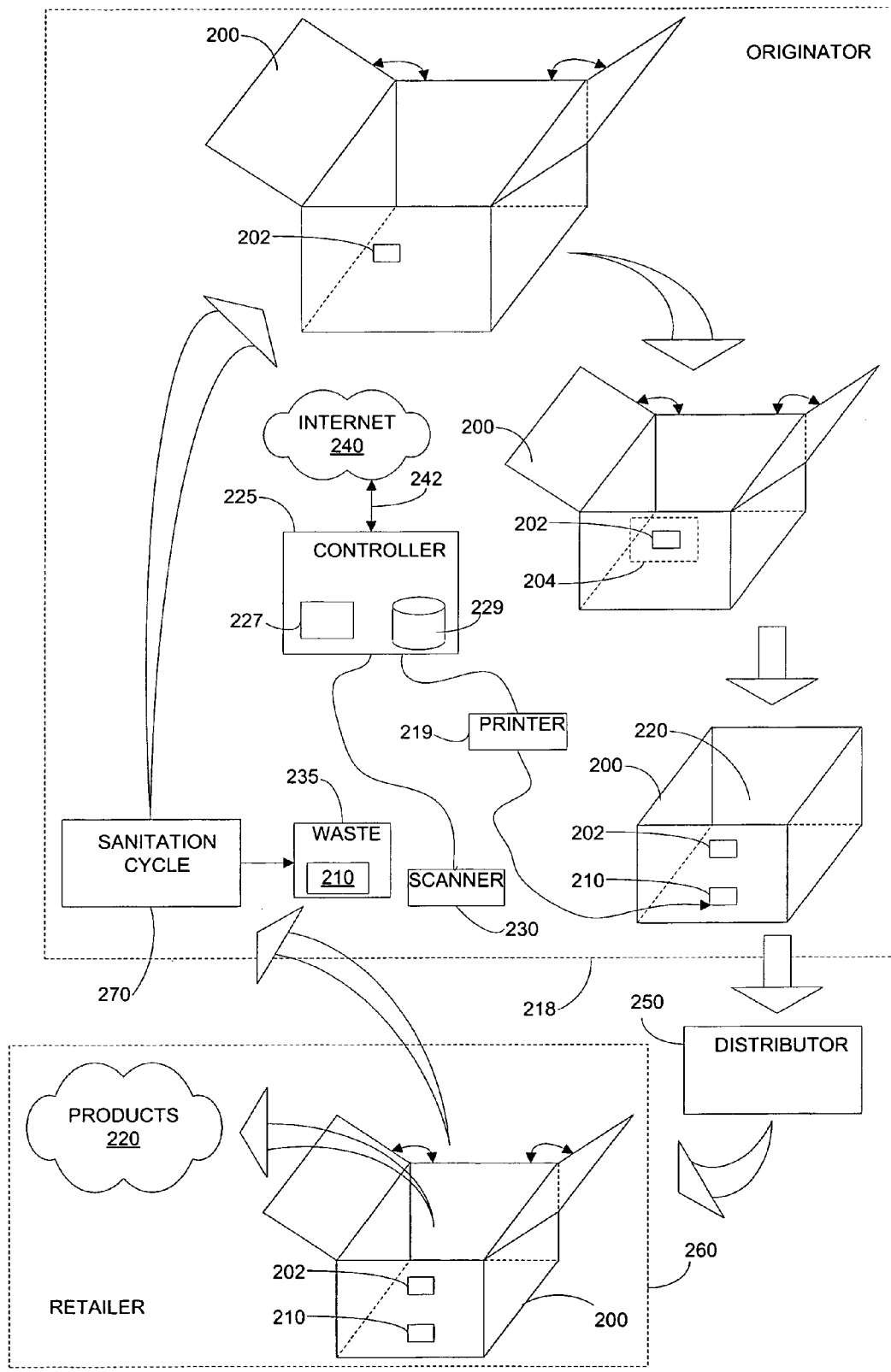
FIG. 2 is a pictorial representation of an RPC distribution, in accordance with an embodiment of the present invention.

FIG. 1 is flowchart of the RPC identification and tracking process 100, in accordance with an embodiment of the present invention. The identification and tracking process 100 replaces the typical, prior art "slap and ship" process described above. FIG. 2 is a pictorial representation of an RPC 200 distribution, in accordance with an embodiment of the present invention. In an operation 105, a durable RFID tag 202 is attached to the RPC 200. The durable RFID tag 202 is designed to withstand a selected number of sanitation cycles.

By way of example, the RPC 200 can be sanitized for a minimum of at least about 40 sanitation cycles before the durable RFID tag 202 reaches projected failure.

The durable RFID tag 202 can be attached to the RPC 200 using a protective cover 204 that can be secured over the durable RFID tag. By way of example the durable RFID tag 202 can be attached to the RPC 200 and the protective cover 204 can be heat bonded, sealed to the RPC to both secure the durable RFID tag to the RPC and to protect the durable RFID tag. The protective cover 204 can be sealed to the RPC 200 with a suitable adhesive or be bonded such as with a heat sealing bond or any other mechanical or chemical securing mechanism (e.g., screws, rivets, glue, etc.) and combinations thereof.

The durable RFID tag 202 can be attached to the RPC 200 in a strategic location that is relatively protected from wear and tear in the handling of the RPC and through the sanitation cycle. By way of example, the durable RFID tag 202 can be installed on the RPC 200 in a groove on one side of the RPC. Another strategic location is near the bottom and/or near a corner.

The durable RFID tag 202 can be attached or embedded in the RPC 200 by the manufacturer of the RPC (e.g., Orbis Corporation) as value-added service. Alternatively, the originator 218 loading the RPC 200 can attach the durable RFID tag 202 to the RPC 200. The RFID tag 202 can also be attached to the RPC 200 individually, in-situ (e.g., as the RPC is filled) or in bulk, ex-situ where multiple durable RFID tags 202 are attached to a corresponding multiple RPCs 200. By way of example, the durable RFID tag 202 can be attached to the RPC 200 on a harvester, as the produce is harvested in the field and packed in the RPC.

Figure 3:
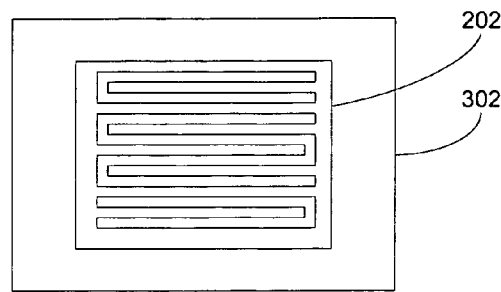
FIG. 3 is a durable RFID tag, in accordance with an embodiment of the present invention.

FIG. 3 is a durable RFID tag 202, in accordance with an embodiment of the present invention. The durable RFID tag 202 can include a protective packaging 302. The durable RFID tag 202 can be packaged in the protective packaging 302 prior to installation on the RPC 200. The protective packaging 302 can be used in addition to or instead of the protective cover 204. By way of example, the protective packaging 302 can be a plastic, thermoplastic, composite or any other suitable packaging material.

Referring again to FIGS. 1 and 2, in an operation, 110, a sticker-label 210 containing the barcode and content description is printed. In an operation 115, the sticker-label 210 is applied to the RPC 200. As the sticker-label 210 will ultimately be removed in the sanitation cycle 270 toward the end of the shipping cycle. Separating the sticker-label 210 from the durable RFID tag 202 allows the sticker-label to be made from materials and adhesives that are optimized for the sticker-label lifecycle of a single shipping cycle. The sticker-label 210 can therefore be more easily and completely removed during the sanitation cycle, thereby simplifying the sanitation cycle.

In an operation 120, the RPC 200 is packed with a selected quantity of a selected product 220. The sticker-label 210 can be applied to the RPC 200 as the products 220 are placed in the RPC. By way of example in the produce industry, the sticker-label 210 can be applied to the RPC 200 as the produce is harvested in the field and packaged into the RPC.

In an operation 125, the durable RFID tag 202 is scanned by a scanner/programmer 230 to correlate the durable RFID tag to the sticker-label 210 and the contents 220 of the RPC 200. By way of example, scanning the durable RFID tag 202 can retrieve a RFID output including an identification number for the durable RFID tag. The identification number for the durable RFID tag 202 can then be correlated or assigned in a database 229 to the information contained in the sticker-label 210 and the contents 220 of the RPC 200. Correlating the contents 220 to the durable RFID tag 202 can be accomplished by presenting a set of possible contents (e.g., a computer screen can display buttons representing most recently loaded contents) and selecting the corresponding contents. Scanning the durable RFID tag 202 can also include programming the durable RFID tag to correspond to the sticker-label 210 and the current contents 220 of the RPC 200.

It should also be understood that operations 105-120 can be performed in any order and not limited to the order presented above. By way of example, the RPC 200 can be filled with contents 220 prior to attaching the RFID tag 202 and attaching the sticker-label 210 or any other order suitable for the desired user's operations.

The durable RFID tag 202 can be programmable (such as the Alien Technology "Squiggle" Tag) that allows at least a portion of the data output or read from the durable RFID tag to be changed. Reprogramming the durable RFID tag 202 allows the durable RFID tag to be used with many different types of contents 220. By way of example, in a first shipment cycle, the RPC 200 can be used to pack and ship broccoli and the durable RFID) tag 202 can be programmed to identify that the current contents contain broccoli and/or a quantity, weight, an order number, a catalog number, or other descriptive data as may be desired. In a subsequent shipment cycle, the contents 220 of the RPC 200 can be various colors and sizes of men's crew socks and the durable RFID tag 202 can be programmed to identify the current contents (e.g., various colors and sizes of crew socks).

In an operation 130, the packed RPC 200 is transferred through a distribution system to one or more distributors 250 and to a retailer 260. The durable RFID tag 202 can be read numerous times during distribution of the RPC 200 to allow tracking of the RPC while in transit. By way of example, if the RPC 200 passed through a transit terminal of the one or more distributors 250 enroute between the originator 218 and the retailer 260, the durable RFID tag 202 can be read and entered into a tracking database. This allows the location and route of the RPC 200 to be accessible if the RPC would need to be located while in transit.

Further, the durable RFID tag 202 may be reprogrammed at any of the intermediate transit locations (e.g., one or more of the distributors 250). By way of example, a portion of the durable RFID tag 202 may be reprogrammed when the RPC 200 is inspected such as customs and security checkpoint at a port of entry or exit. The durable RFID tag 202 could also be reprogrammed at an intermediate location to indicate other testing or status of the RPC 200. By way of example, if the contents 220 are food products (e.g., produce, fruit, vegetables, etc.) the RPC 200 may be inspected, tested for contaminants or infestations or insects of vermin and/or decontaminated. A portion of the durable RFID tag 202 may be reprogrammed to indicate the corresponding status of the RPC 200 including, for example, a current testing, inspection, decontamination process applied to the RPC.

In an operation 135, the retailer 260 removes the contents 220 from the RPC 200. In an operation 140, the RPC is returned to the originator 218. The durable RFID tag 202 can be scanned by the retailer 260 to identify the correct originator 218 of the RPC 200.

In an operation 145, the originator 218 applies a sanitation cycle 270 to the RPC 200 to prepare the RPC 200 for a subsequent use. The sanitation cycle 270 removes the sticker-label 210 and any contaminants, residues from the RPC 200. In the sanitation cycle 270, the durable RFID tag 202 remains attached to the RPC 200.

The durable RFID tag 202 also allows the sanitation cycle 270 to include an automated sorting of the RPC 200 by use. By way of example, the RPCs 200 can be sorted into RPCs that have been used for produce and RPCs that have been used for other uses (e.g., non-produce, non-foodstuff, auto parts, etc.). This could further reduce costs as the different uses may have different levels of cleaning specified to prepare the RPC 200 for a subsequent use.

Figure 4:
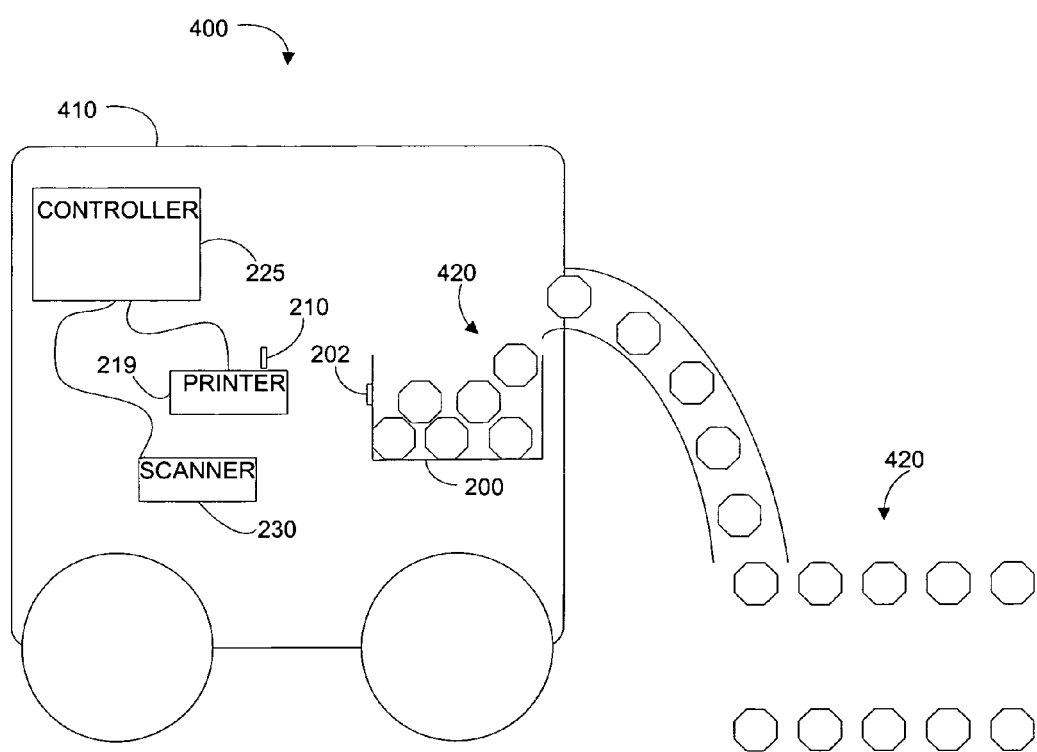
FIG. 4 is a schematic diagram of a system for identifying RPCs at the point of harvest, in accordance with an embodiment of the present invention.

FIG. 4 is a schematic diagram of a system 400 for identifying RPCs 200 at the point of harvest, in accordance with an embodiment of the present invention. The durable RFID tag 202 can be reprogrammed and the sticker label 210 printed on the harvester 410, as the produce 420 are harvested in the field and loaded into the RPC 200. A handheld (e.g., palm, laptop or tablet) computer can be the system controller 225. The controller 225 can read and/or program the durable RFID tag 202 using a well known compatible programmer/reader 230.

A barcode printer 219 can print corresponding sticker labels 210 for the RPC 200. As described above, the RFID tag 202 and the corresponding sticker labels 210 can be stored in a database 229. The database 229 can be made accessible, such as by the Internet 240, to other parties (e.g., shippers, distributors 250, retailers 260, etc.) in the distribution system. The cost of the handheld computer/controller 225, scanner 230, printer 219 and applicable software 227 is negligible when compared to savings gained by using the durable RFID tags 202.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for identifying a reusable plastic container (RPC) comprising:
    attaching a durable RFID tag to the RPC;
    attaching a separate sticker-label to the RPC, the separate sticker-label including printed information relating to the RPC;
    filling the RPC with a selected contents;
    scanning the durable RFID tag; and
    applying a sanitation cycle to the RPC, including removing the separate sticker-label, the separate sticker-label being optimized for removal during the sanitation cycle, the durable RFID tag being optimized to remain functional and attached to the RPC through a selected number of multiple sanitation cycles.

2. The method of claim 1, wherein the durable RFID tag includes a protective package.

3. The method of claim 1, wherein attaching the durable RFID tag to the RPC includes securing the durable RFID tag to the RPC with at least one of a heat bond, an adhesive bond or a mechanical fastener.

4. The method of claim 1, wherein attaching the durable RFID tag to the RPC includes applying a protective cover to protect the durable RFID tag to the RPC.

5. The method of claim 1, wherein at least a portion of the durable RFID tag is reprogrammable.

6. The method of claim 5, wherein at least a portion of the durable RFID tag is reprogrammed to correspond to at least one of a contents of the RPC, a transit location of the RPC or a status of the RPC.

7. The method of claim 1, wherein at least one of the durable RFID tag and the separate sticker-label are attached to the RPC substantially in-situ as the RPC is filled with the selected contents.

8. The method of claim 1, wherein scanning the durable RFID tag includes correlating an output from the durable RFID tag to the selected contents.

9. The method of claim 1, further comprising:
    transferring the RPC from an originator to a retailer;
    removing the contents from the RPC; and
    returning the RPC to the originator for the sanitation cycle.

10. The method of claim 1, wherein the sanitation cycle includes:
    sorting the RPC by the selected contents; and
    cleaning the RPC according to a cleanliness specification for the selected contents.

11. The method of claim 1, wherein the selected contents include fresh produce.

12. A method for identifying a reusable plastic container (RPC) comprising:
    attaching a durable RFID tag to the RPC;
    attaching a separate sticker-label to the RPC, the separate sticker-label including printed information relating to the RPC;
    filling the RPC with a selected contents, wherein the durable RFID tag and the separate sticker-label are attached to the RPC substantially simultaneously as the RPC is filled with the selected contents;
    programming at least a portion of the durable RFID to correspond with the selected contents;
    transferring the RPC from an originator to a retailer;
    removing the contents from the RPC;
    returning the RPC to the originator; and
    applying a sanitation cycle to the RPC, including removing the separate sticker-label, the separate sticker-label being optimized for removal during the sanitation cycle, the durable RFID tag being optimized to remain functional and attached to the RPC through a selected number of multiple sanitation cycles.

13. The method of claim 12, wherein the selected contents are produce and wherein the RPC is filled with the produce as the produce is harvested.

14. A reusable plastic container (RPC) system comprising:
a RPC;
a durable RFID tag attached to the RPC; and
a separate sticker-label attached to the RPC, the separate sticker-label including printed information relating to the RPC, the separate sticker-label being optimized for removal during a sanitation cycle, the durable RFID tag being optimized to remain functional and attached to the RPC through a selected number of multiple sanitation cycles.

15. The system of claim 14, wherein the durable RFID tag includes a protective package.

16. The system of claim 14, wherein the durable RFID tag is attached to the RPC with at least one of a heat bond, an adhesive bond or a mechanical fastener.

17. The system of claim 14, wherein the durable RFID tag is attached to the RPC by a protective cover to protect the durable RFID tag to the RPC.

18. The system of claim 14, wherein at least a portion of the durable RFID tag is reprogrammable.

19. The system of claim 14, further comprising:
a controller;
a RFID tag scanner coupled to the controller and located in a location suitable for scanning the durable RFID tag; and
a sticker-label printer coupled to the controller.

20. The system of claim 19, wherein at least a portion of the durable RFID tag is reprogrammable and the RFID tag scanner is capable of reading and programming the durable RFID tag.

* * * * *